United States Patent

[11] 3,607,325

[72] Inventors Earl G. Spangler
Corona Delmar;
Milton M. Moore, Laguna Beach; Ronald L. Topp, La Crescenta, all of Calif.
[21] Appl. No. 738,205
[22] Filed June 19, 1968
[45] Patented Sept. 21, 1971
[73] Assignee Lockheed Aircraft Corporation
Burbank, Calif.

[54] REFRACTORY-CERAMIC COMPOSITION AND METHOD
7 Claims, 1 Drawing Fig.
[52] U.S. Cl. .................................................. 106/64,
106/69, 106/104
[51] Int. Cl. ...................................................C04b 35/02,
C04b 35/14
[50] Field of Search .......................................... 106/64, 69,
10 H; 23/182

[56] References Cited
UNITED STATES PATENTS
2,874,071  2/1959  Kadisch et al. ...............  106/64

*Primary Examiner*—James E. Poer
*Attorneys*—George C. Sullivan and Lowell G. Turner ABSTRACT: A refractory-ceramic composition is disclosed which contains from 15 to 30 percent by weight calcium aluminate cement and the balance a fused silica particle mixture, this mixture being composed of rodlike and platelike fused silica particles of as great a degree of purity as reasonable possible. The mixture of the silica particles is graded as to size so as to have a high proportion of comparatively large particles which abut against and interfit with one another in the final composition. Such a refractory-ceramic composition is formed into a final article by being mixed with water, then by being cast into a desired shape and then by being allowed to hydrate or "cure" so as to become hard. The resulting article is preferably air dried and then gradually heated to a temperature slightly above the temperature at which it will be used.

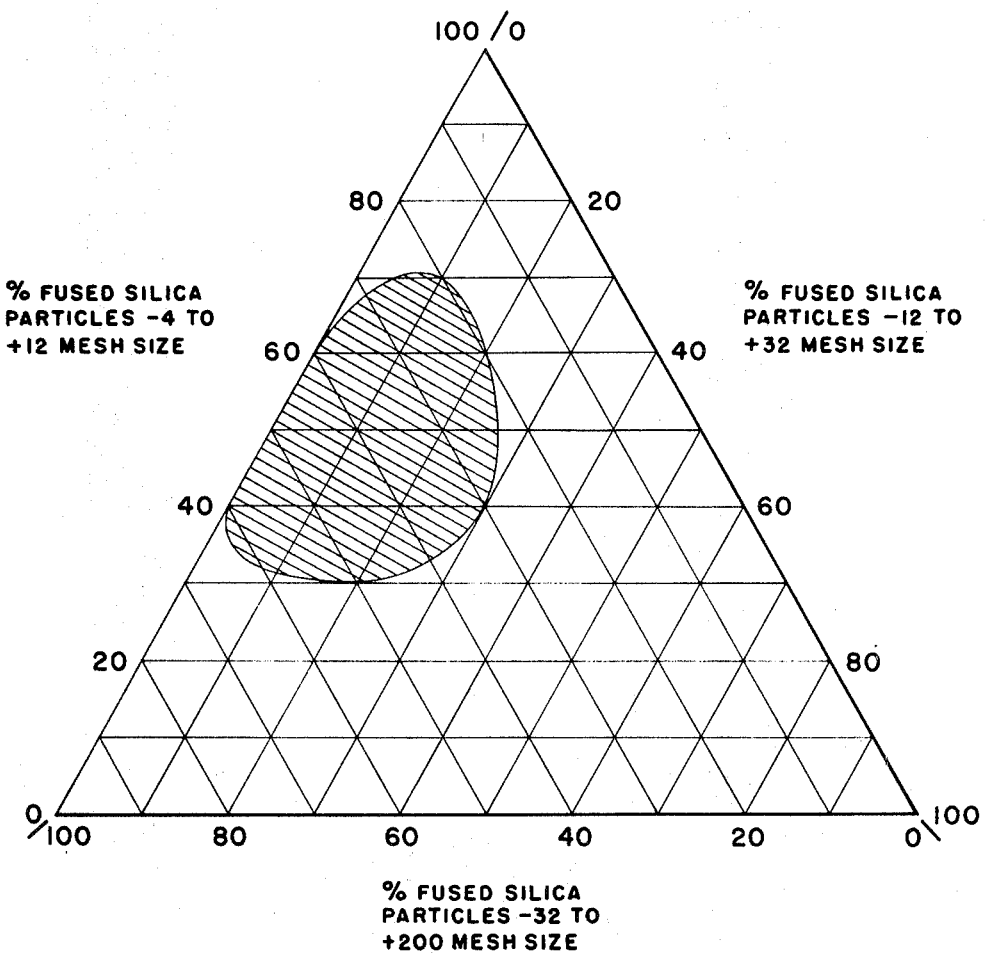

REFRACTORY-CERAMIC COMPOSITION AND METHOD

BACKGROUND OF THE INVENTION

A considerable amount of research and development work has been directed to the production of refractory-type ceramic compositions or mixtures containing a hydraulic cement or cementlike composition and one or more heat-resistant or refractory inorganic materials serving much as a filler or aggregate in connection with the cement or cementlike composition. Mixtures of these types are considered to be particularly desirable for use in many different applications because they can be formed into a concrete or concretelike body or article by the simple steps of mixing such a mixture with water, casting the resulting mixture into a form or mold of desired configuration, and then allowing such a mixture to cure or harden in the mold.

In the field of such refractory-ceramic compositions or mixtures the term "cement" is most commonly used to designate any of a variety of different materials or mixtures which exhibit properties somewhat analogous to the properties of common Portland cement. Indeed, much of the nomenclature in the field of such castable refractory-ceramic compositions or mixtures is substantially the same as the nomenclature commonly employed in the Portland cement industry.

Thus, the term "aggregate" as used in the field of refractory-type ceramic compositions employing a hydraulic cement is used in an analogous sense to the manner in which this term is employed in the Portland cement field. Aggregates are used in the field of refractory types of composition to designate inorganic materials which are directly determinative of the final ultimate properties obtained with such a composition. The term "concrete" may be employed in the field of refractory-ceramic compositions to designate an ultimate article in which the individual aggregate bodies or particles are bonded and held with respect to one another through the bonds obtained by the hydration of the cement or cementlike material employed.

Prior castable refractory-ceramic compositions of the type to which the present invention pertains have utilized a number of different cements or cement compositions and refractory-type aggregates. Among such cement materials are common and specialized types of Portland and aluminous cements. Virtually every type of refractory or semirefractory material commonly available has been used with various such cements. Various different aggregates and different sized aggregates are considered to be best suited for various different applications. Similarly, various different cements have properties which make them especially desireable for certain uses.

At the present time it is desired to utilize various castable refractory-ceramic compositions for certain tooling applications such as in forming tools or dies capable of being continuously used in forming metals at temperatures of up to about 1850° F. and capable of being used for comparatively short periods at temperatures up to about 2300° F. Such ceramic dies or tools are considered to have certain distinct economic advantages over prior metal tooling used for the same or related purposes. The elevated character of these temperatures precludes the effective use of certain recognized or established castable refractory compositions or mixtures. The reasons why other various known castable refractory-ceramic compositions are not suitable for use at temperatures of around 1850° F. and for use at short periods at temperatures up to about 2300° F. tend to be comparatively complex. A detailed discussion of these reasons is far beyond the scope of this specification.

It will be realized that many cement or cement-type hydrates will break down or otherwise change at temperatures with the range indicated or frequently even at lower temperatures. Obviously, whenever this occurs the bond between the cement and the refractory obtained in a concrete article will be damaged and as a consequence in due course the article itself will become damaged. Further, many materials within certain cements will tend to significantly change dimension either because of a relatively high coefficient of thermal expansion or because of changes in chemical structure at comparatively high temperatures such as temperatures within the ranges indicated. Similarly, the refractory used as aggregate with any cement may tend to change dimension for the same or similar reasons at relatively high temperatures.

These factors have narrowed the field of materials capable of being used as forming tools at comparatively high temperatures within the ranges indicated to a significant extent. It has been proposed that a particularly suitable cement for prolonged usage at up to about 1850° F. and for comparatively short term at higher temperatures are common aluminous cements. When properly cured or hardened such cements are relatively stable at up to these temperatures. It has also been recognized that a suitable refractory aggregate for use with such aluminous cement should be common fused silica. Fused silica is well recognized as having a comparatively low coefficient of thermal expansion.

However, prior castable refractory-ceramic compositions using aluminous cements and fused silica particles or aggregate are not considered to have been completely satisfactory for certain tooling applications for either of several different reasons. When such cement or such aggregate contains various fluxing type oxides such as ferric oxide, potassium oxide, sodium oxide in more than a comparatively minor amount any such oxide may further react within the ultimate concrete created from such a composition so as to detrimentally affect its properties.

Further, it is considered that the prior fused silica employed in such compositions has normally contained small but significant amounts of a crystalline form of silica known as cristobalite. This particular form of silica will not effectively withstand heat shock. Also, it has a significantly greater coefficient of thermal expansion than glassy fused silica. Perhaps it is more important that silica in this crystalline form will change into other crystalline forms with temperature changes and that such changes in crystalline form are accompanied by dimensional changes. As a result even comparatively small amounts of cristobalite are considered to be detrimental to satisfactory refractory concrete tooling performance.

Another factor which is considered to have resulted in the poor performance of tooling created from castable refractory-ceramic compositions formed from an aluminous cement and fused silica particles is of a somewhat different character. The strength of any such tooling in the past has been considered to have been principally determined to a large extent by the cement-silica particle bonds created upon the hydration of the cement. It is considered that in such prior concretes the cement acts to a large degree as a suspending phase, merely holding the aggregate particles with respect to one another so that these particles act more or less as a filler. In a composition where this occurs desired ultimate properties are not considered to be reached because the aggregate particles do not effectively cooperate with one another so that the primary strength of the ultimate concrete article is to a large extent dependent upon the mechanical properties of the aggregate particles.

BRIEF SUMMARY OF THE INVENTION

An object of this invention is to provide new and improved castable refractory-ceramic compositions. A more specific object of this invention is to provide such compositions which employ a mixture of an aluminous cement and fused silica particles. Another object of this invention is to provide compositions of this type which may be easily and conveniently employed so as to create concrete articles capable of prolonged effective use as tooling in connection with the fabrication of metal parts at relatively elevated temperatures. These generalized objectives of this invention do not effectively indicate or suggest the important features of this invention. Concrete articles in accordance with this invention possess distinctive and advantageous properties especially adapting them for use as tooling in the fabrication of metal articles by virtue of a variety of interrelated factors.

A refractory composition of this invention employs rodlike or platelike fused silica particles of as great a degree of purity as it is reasonably possible to obtain, and uses these particles as an aggregate of sizes proportioned so that these particles abut against and interfit with one another to as great a degree as reasonably possible so as to achieve what may be easily referred to as a "bridge"-type or interlocked type of aggregate structure in a final concrete body. Within this structure the smaller particles of the aggregate primarily serve to fill or occupy the spaces between the larger particles so as to tend to prevent their shifting out of their interlocked or interfitted positions. Within a concrete article in accordance with this invention the aluminous cement merely serves as an additional binder tending to prevent shifting of any of the aggregate particles.

To a degree this is, of course, an oversimplification. In a refractory composition of the present invention formed as a complete concrete article aluminous hydrates formed from the cement are capable of withstanding the temperature at which the articles are to be used and, hence, to at least a degree, are refractories. These hydrates also in and of themselves have desirable physical strength characteristics. Similarly, the interfitting of the aggregate particles in such an article tends to create a binderlike action in the entire article, to at least a degree supplementing the action of the aluminous cement hydrate bonds. Such aggregate particles, of course, have desirable strength characteristics at the various temperatures at which the article is intended to be used and only expand and contract to a limited extent.

In a composition of this invention used as a concrete the proportions of the cement and the aggregate are preferably carefully controlled so as to achieve the most desirable properties. Similarly, the sizes of the fused silica aggregate particles are also carefully controlled for the same reason. It is considered that the most advantageous ultimate properties in a concrete article created from such a composition are achieved when the composition is mixed with a controlled amount of water, and when the cement is allowed to hydrate after the article is cast under such conditions that the amount of water remains relatively constant.

BRIEF DESCRIPTION OF THE DRAWING

Further details of this invention as well as many objectives and advantages of it will be apparent from a detailed consideration of the remainder of this specification and the accompanying drawing in which:

The FIGURE shows a triaxial diagram indicating the proportions of different sized fused silica particles which should be employed with the present invention in order to obtain most desirable results.

DETAILED DESCRIPTION OF THE INVENTION

The aluminous cements which are utilized in the present invention are finely ground hydraulic aluminous cements containing a comparatively high proportion of calcium. Preferably the particles within this cement should be −200 mesh as measured on a standard Tyler screen. Chemically these cements are mixtures of primarily monocalcium aluminate, $CaO \cdot Al_2O_3$, subcalcium aluminate, $CaO \cdot 2Al_2O_3$, and percalcium aluminate, $12CaO \cdot 7Al_2O_3$. In addition such cements normally contain comparatively minor quantities of other components including quantities of conventional Portland cement compounds in an aluminous cement will vary depending upon raw materials used in making the cement, the manufacturing conditions employed during its manufacture and other related factors.

Typical aluminous cements contain various oxide ingredients in the proportions indicated by the following table:

| Oxide | Percent by Weight |
|---|---|
| $SiO_2$ | 3–11 |
| $Al_2O_3$ | 33–44 |
| CaO | 35–44 |
| $Fe_2O_3$ | 4–12 |
| FeO | 0–10 |

In general, such cements created by sintering techniques contain a higher proportion of iron oxide than the fused types of such cements. These fused types only contain up to about 1 percent by weight of an iron oxide. In general, it is considered that an aluminous cement used with this invention should contain as little iron oxide as is reasonably possible. For this reason it is considered preferable to use with this invention a fused type of aluminous cement.

It is recognized that the foregoing description of aluminous cements does not completely describe these cements. To a degree many factors with respect to these cements are unknown because of the difficulty of analysis. However, aluminous cements as a class of cements are well-recognized and are commonly sold as articles of commerce. Further details with respect to cements of this type are given in the text by Czernin entitled *Cement Chemistry and Physics for Civil Engineers*, published in 1962 by the Chemical Publishing Co., New York, N.Y. Chapter 6 of this text appearing on pages 117 to 125 pertains to aluminous cement and in the interest of brevity is incorporated herein by reference.

The fused silica which is used in compositions of the present invention is a glassy, amorphous form of silica having a vitreous character. Such fused silica may be created in various known methods by slow cooling of molten silica or by heating any form of silica to its softening temperature (below fusion) and then cooling. It is understood that certain commercial methods of manufacturing this material have proved to be exceptionally effective in developing a product which is free of substantially free from various crystalline forms of silica which act as contaminants in the fused particles employed with this invention.

A particularly objectionable contaminant which preferably should be substantially completely absent or should be absent to as great a degree as possible from the fused silica particles employed is cristobalite. The various forms of silica are explained in detail in a number of different authorities such as the text by Moeller, *Inorganic Chemistry*, published in 1952 by John Wiley & Sons, New York, N.Y. In the interest of brevity pages 691, and 693 of this text regarding various forms of silica are incorporated herein by reference. The fused silica used should also be as free as possible from contaminants such as iron oxides, sodium oxide, potassium oxide and the like which tend to be relatively reactive or to act as fluxes at the temperatures at which a concrete article as herein described may be used.

The silica particles employed with this invention differ significantly from most common particles of different materials. Inasmuch as these particles substantially all have flat, platelike or rodlike shapes, they are distinguishable from most common particles which are essentially granular and which tend to have rounded or similar edges and corners. Because of inevitable manufacturing difficulties and abrasion occuring during handling the silica particles used with this invention may contain some conventionally shaped particles. . In general the proportion of such conventionally shaped particles should be held as low as possible. Such flat, platelike and rodlike shaped particles of fused silica may be obtained commercially. It is considered that particles of these shapes are produced by grinding fused silica by impact methods.

Because of the nature of the shapes of the fused silica particles which preferably should be employed with this invention it is difficult if not impossible to define them more specifically by reference to their purely geometric shapes. However, these particles may be easily distinguished from other more conventional particles by virtue of a property which they exhibit. When fused silica particles of a particular size range are poured through an opening of restricted size through which conventional granular materials of a similar size will flow the particles of fused silica of the present invention will tend to form a "bridge"-type of structure above such an opening. Such a "bridge"-type of structure will normally either seriously impede or completely stop the flow of such silica particles through such an opening. Hence, the fused silica particles which are employed with this invention may be described as essentially "nonflowing" type of particles.

In a final concrete of this invention this so-called bridging-type property is effectively utilized to as great a degree as is reasonably possible so that the individual fused silica particles in and of themselves practically form a stable structure without any assistance from the binder cement utilized. The proportions and sizes of such fused silica particles and the aluminous cement used in a composition of this invention are preferably related so as to obtain a mixture of these ingredients which is capable of being mixed and cast without difficulty and which has desirable strength characteristics. In accomplishing these objectives it has been found that best results as to thermal shock resistance strength and the like in an ultimate concrete article are achieved when the individual fused silica particles are proportioned as to size as indicated in the accompanying drawing.

From an examination of this drawing it will be seen that it is a triaxial diagram or graph illustrating proportions of fused silica particles of from −4 to +12 mesh size, of particles from −12 to +32 mesh size and from −32 to +200 mesh size. In all cases in this specification the size designations are with reference to standard Tyler screen sizes, the designation - is to indicate that particles will pass a certain size screen and the designation + indicates that particles will not pass a designated size screen. Because of the flat platelike and rodlike configurations of the fused silica particles employed with this invention this designation of particle sizes with reference to a standard screen is not to be considered as a completely accurate designation of the sizes of these particles. However, it is sufficiently accurate for practical purposes.

In the diagram shown in the drawing there is an area indicated by crosshatching which shows the proportions of various sized fused silica particles which should preferably be utilized together in order to achieve the best results with the present invention. Because of the curved nature of this area it is difficult to express it in words. From the drawing it will be seen however, that in a composition of this invention preferably from about 40 to 80 percent by weight of the fused silica particles should be from a −4 to a +12 mesh size; preferably from about 20 to about 60 percent by weight of these particles should be of from a −32 to a +200 mesh size; and preferably from about 0 to about 30 percent by weight of these particles should be of an intermediate −12 to +32 mesh size. It will be realized that the comparatively low or small amount by weight of intermediate size particles differs from known practice with respect to aggregates.

The fused silica particles in the composition of this invention are proportioned so that the comparatively large size particles achieve the so-called bridging effect within the final concrete product to as great an extent as reasonably possible consistent with the achievement of the other characteristics desired. By virtue of the flat platelike and rodlike shape of these particles they provide an interfitting type of action yielding very good strength characteristics in the final product. It is considered that if a greater proportion of intermediate size particles were present in the composition this bridging type of action would be interfered with.

The so-called "fines" or fraction of smaller particles is of such a nature so as to effectively fill in the voids or spaces between the larger particles so as to resist movement of the larger particles with respect to one another. However, extremely small particles such as −200 mesh particles are preferably avoided to as great a degree as possible since they have a high surface area per unit of weight. This increases the water required in a concrete mixture in order to obtain a desired fluidity to an extent considered detrimental to ultimate properties in a concrete article created from such a mixture by curing or hardening.

Such movement of the larger particles with respect to one another is of course also prevented by the cement employed. In general the lower the amount of aluminous cement used the lower the strength of the final concrete article. On the other hand if an excess of this cement binder is employed over that required to hold the individual silica particles in place there is a distinct tendency toward microcracking in the final concrete article. Such cracking is considered to be undesirable as detrimentally effecting the useful life of a piece of tooling created from a refractory-ceramic composition of this invention. On the basis of experiments it has been determined that a concrete article from such a composition will have adequate strength and will give prolonged satisfactory performance without cracking or spalling if from about 15 to 30 percent by weight of such a dry, unhydrated composition is an aluminous cement and the remainder consists of fused silica particles proportioned as indicated.

A dry refractory ceramic composition of this invention may be created by merely tumbling or otherwise mixing the correct proportions of the ingredients together. In so doing the bridging properties of the fused silica particles have been noted as hindering or preventing the discharge of such a final composition from a common type of mixer. Once mixed, the final composition may be bagged and shipped prior to use.

In use the dry mixture is preferably formed into a concrete mixture by being mixed with no more water than is necessary to secure hydration of the cement to a degree necessary to form hydrate type bonds along the surfaces of the silica particles so as to hold all of these particles together. Fortunately this amount appears to be substantially the same as the amount required so as to impart a desired fluidity necessary to enable the concrete mixture to be cast into a mold. The amount of water which should be used in order to accomplish these objectives is considered to be within the range of from about 9 to about 13 percent by weight of the weight of the dry ingredients of the complete composition. In general if lesser amounts of water are used the strength of the ultimate concrete material to be obtained will be decreased undesirably and the initial viscosity of the concrete mixture will be undesirably high while if greater amounts of water are used the strength of such a concrete article will also tend to fall off, presumably because of problems attendant to the escape of water in excess of that needed to form the hydration bonds.

A castable refractory-ceramic composition concrete mixture as indicated should of course be thoroughly mixed. Because aluminous cements tend to cure or harden within relatively short periods it is considered that a water-composition or concrete mixture as described should be cast in an ultimate mold as soon as reasonably convenient after the mixture has been mixed or formed. In general, the longer the time after mixing of such a mixture, the higher the viscosity of the concrete mixture because of "setting" of the cement. In general times of about 20 minutes are adequate to allow concrete mixtures as herein described to be located within a mold without the setting of the cement being significantly noticeably. Vibration may be employed to help convey such a concrete mixture into a mold.

Any desired type of mold can be employed. Preferably any mold used is coated with a conventional release agent such as a silicone grease. During this process such a concrete mixture may be vibrated, tamped or otherwise handled as any other hydraulic cement mixture so as to eliminate voids or air pockets and so as to smooth out the surface of such a mixture. If a concrete mixture of this type is vibrated as it is being located in the mold the amount of such vibration should be as limited as reasonably possible so as to avoid interference with the bridging or interlocking of the larger fused silica aggregate particles. If such vibration is carried on to too great an extent with a concrete mixture there will be a tendency toward undesired stratification of the fused silica particles in the ultimate product.

Following this type of casting operation the cement in the concrete mixture is allowed to set up or cure at normal ambient temperature (68°–72° F.) for a period sufficient so that the vast majority of the ultimate strength of the cement hydrate is developed. Usually this is within the range of from 68°–100b$L$ F. since at lower temperatures the rate of hydration is undesirably slow. In general this period is 24 hours. Longer periods can, of course, be used. During this hardening the concrete mixture should preferably be shielded from ambient air so as to hold the water content of the mixture relatively constant. When this is done a change in properties resulting from a change in water content is prevented.

Following curing the concrete article created by the hydration of the cement is preferably dried at above the boiling point of water so as to remove from the article any water which has not entered into the formation of hydrates. Preferably, the resultant concrete article is thereafter heated gradually to a temperature at least to 100° F. above the temperature at which the article will be used, but not to exceed 2300° F. During such heating a minor amount of shrinkage will take place causing the ultimate concrete part to assume the dimensions it will have during use conditions. After such heating the concrete article is ready for use.

As an example of this invention a refractory-ceramic composition can be formed containing 20 percent by weight commercial aluminous or calcium aluminate cement, and 80 percent by weight of fused silica particles having a predominantly flat platelike or rodlike shape, graded as to size so that 60 percent of these particles by weight are from −4 to +12 mesh size, 20 percent of these particles by weight are −12 to +32 mesh size and 20 percent of these particles by weight are from −32 to +200 mesh size.

After thorough mixing the ingredients of this composition can be admixed with 10 percent by weight of water, this 10 percent by weight being calculated on the basis of the dry ingredients being 100 percent. After thorough mixing with the water the resulting cement mixture may be cast into a mold as the mold is vibrated until it is filled; then the concrete mixture in the mold may be held at a temperature of from about 70° to 90° F. for a period of 24 hours while it is covered with a thin polyethylene sheet to control the water content of the mixture.

After curing the concrete resulting it is preferably air dried at an ambient temperature such as the temperature of about 100° F. for at least 24 hours and for longer periods if the article is over 6 inches thick. After the air drying the resultant article may be prepared for use by heating at 1 hour per inch of thickness at 175° F. Thereafter for one-half hour per inch of thickness at 250° F. During such heating it is considered that any water which is not chemically combined in hydrates in released from the article.

Thereafter the article can be heated at gradually increasing temperatures which increase at the rate of 50° F. per hour until the temperature of the article has passed the temperature of 500° F. Thereafter the temperature of the article can be raised at a rate of about 300° F. per hour until a temperature of about 1850° F. is achieved. After cooling the article is ready to be used.

Cast refractory-ceramic concrete articles in accordance with this invention can be used as tooling in connection with the fabrication of metal parts and for other purposes for prolonged periods at a temperature of about 1850° F. They may also be used for comparatively short periods such as periods up to about 1 hour at temperatures up to about 2300° F. without any noticeable tendency to deteriorate. During such use these articles exhibit very satisfactory strength characteristics and do not significantly tend to crack or spall. Further, they are very dimensionally stable when compared with various related tooling. Such concrete articles are also highly advantageous in that they are extremely resistant to thermal shock as they are employed.

Because of the nature of this invention the invention itself is to be considered as being limited solely by the appended claims forming a part of this disclosure.

We claim:
1. A refractory-ceramic composition capable of being mixed with water and cast to form a concrete body consisting essentially of a mixture of an aluminous cement and of fused silica particles wherein the improvement comprises:
   said composition containing from about 15 to about 30 percent by weight of aluminous cement and the remainder of said fused silica particles,
   said fused silica particles including a sufficient quantity of flat platelike particles and rodlike particles for said platelike and rodlike particles to interfit with one another in said composition so as to form a "bridge"-type structure in which said flat platelike particles and said rodlike particles abut against and reinforce one another,
   said cement and remainder of said silica particles being capable of fitting within the interstices of such a bridge-type structure.

2. A refractory-ceramic composition as claimed in claim 1 wherein:
   from about 40 to 80 percent by weight of said fused silica particles are from a −4 to +12 mesh size, from about 0 to 30 percent by weight of said fused silica particles are from a −12 to +32 mesh size and from about 20 to 60 percent by weight of said fused silica particles are form a −32 to +200 mesh size, and
   said aluminous cement consists of particles of −200 mesh size.

3. A refractory-ceramic composition as claimed in claim 1 wherein:
   the proportions of said silica particles in said composition are shown in the cross hatched area in the triaxial diagram of the drawing annexed to this specification, and
   said aluminous cement is finely ground so as to consist of particles of −200 mesh in size.

4. A refractory composition as claimed in claim 1 wherein:
   said aluminous cement is fused aluminous cement.

5. A cast refractory-ceramic concrete article capable of being used as tooling in the fabrication of metal parts which comprise:
   flat platelike particles of fused silica and rodlike particles of fused silica interfitting with one another so as to abut against and reinforce one another in such a manner as to have interstices between said platelike and said rodlike particles,
   said interstices being filled with a mixture of fused silica particles which are smaller than said platelike particles and said rodlike particles and a hydrated aluminous cement,
   said cement bonding all of said silica particles to one another,
   the composition of said article without including the weight of the water within said article is from about 15 to 30 percent by weight of said aluminous cement and the remainder fused silica particles.

6. A cast refractory-ceramic concrete article as claimed in claim 5 wherein:
   all of said silica particles are proportioned by size so that from about 40 to 80 percent by weight of all of said particles are form a −4 to +12 mesh size,
   from about 0 to 30 percent by weight of all of said particles are from a −12 to +32 mesh size,
   from about 20 to 60 percent by weight of all of said particles are from a −32 to +200 mesh size.

7. A cast refractory-ceramic concrete article as claimed in claim 6 wherein:
   said aluminous cement consists of particles of −200 mesh size.